United States Patent
Park

(10) Patent No.: US 8,217,988 B2
(45) Date of Patent: Jul. 10, 2012

(54) METHOD AND APPARATUS TO ENCODE IMAGE, AND METHOD AND APPARATUS TO DECODE IMAGE DATA

(75) Inventor: Gwang-hoon Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2066 days.

(21) Appl. No.: 11/181,921

(22) Filed: Jul. 15, 2005

(65) Prior Publication Data

US 2006/0034367 A1 Feb. 16, 2006

Related U.S. Application Data

(60) Provisional application No. 60/601,147, filed on Aug. 13, 2004.

(30) Foreign Application Priority Data

Sep. 22, 2004 (KR) .......................... 10-2004-0075972

(51) Int. Cl.
*H04N 7/00* (2011.01)
(52) U.S. Cl. ........................................................ 348/36
(58) Field of Classification Search ................ 348/36–39
See application file for complete search history.

(56) References Cited

U.S. PATENT DOCUMENTS

| | | | |
|---|---|---|---|
| 6,014,671 A | 1/2000 | Castelli et al. | |
| 6,121,970 A | 9/2000 | Guedalia | |
| 6,124,862 A | 9/2000 | Boyken et al. | |
| 6,157,747 A * | 12/2000 | Szeliski et al. | 382/284 |
| 6,192,393 B1 | 2/2001 | Tarantino et al. | |
| 6,272,235 B1 | 8/2001 | Bacus et al. | |
| 6,331,869 B1 * | 12/2001 | Furlan et al. | 348/36 |
| 6,466,254 B1 * | 10/2002 | Furlan et al. | 348/36 |
| 6,665,872 B1 * | 12/2003 | Krishnamurthy et al. | 725/95 |
| 6,791,598 B1 * | 9/2004 | Luken et al. | 348/36 |
| 2002/0041326 A1 * | 4/2002 | Driscoll et al. | 348/36 |

FOREIGN PATENT DOCUMENTS

| | | |
|---|---|---|
| EP | 1162830 | 12/2001 |
| EP | 1 286 308 A1 | 2/2003 |
| JP | 2002-163686 | 6/2002 |
| KR | 2000-72269 A | 12/2000 |
| KR | 2001-82993 A | 8/2001 |
| KR | 2002-0007945 | 1/2002 |

OTHER PUBLICATIONS

International Search Report dated Nov. 28, 2005 of PCT International Application No. PCT/KR2005/002638.
Korean Office Action dated Mar. 31, 2006 issued in KR 2004-75972.

* cited by examiner

*Primary Examiner* — David Czekaj
(74) *Attorney, Agent, or Firm* — Stanzione & Kim, LLP

(57) ABSTRACT

A method and apparatus to encode an image and a method and apparatus to decode an image are provided. The apparatus to encode an image includes a first encoder to encode an omni-directional image to generate a first bitstream, a data communicator to transmit the first bitstream to a decoding apparatus and to receive position information of a region-of-interest selected from an image reconstructed based on the first bitstream from the decoding apparatus, and a second encoder to encode an image of the region-of-interest based on the position information to generate a second bitstream.

24 Claims, 7 Drawing Sheets

METHOD AND APPARATUS TO ENCODE IMAGE, AND METHOD AND APPARATUS TO DECODE IMAGE DATA

CROSS-REFERENCE TO RELATED APPLICATIONS

This application claims the benefit under 35 U.S.C. §119 of Korean Patent Application No. 2004-75972, filed on Sep. 22, 2004, in the Korean Intellectual Property Office, and of U.S. Provisional Patent Application No. 60/601,147, filed on Aug. 13, 2004, in the U.S. Patent and Trademark Office, the disclosures of which are incorporated herein in their entirety by reference.

BACKGROUND OF THE INVENTION

1. Field of the Invention

The present general inventive concept relates to an image encoding/decoding technique, and more particularly, to a method of encoding/decoding an omni-directional image for three-dimensional (3D) realistic broadcasting.

2. Description of the Related Art

Omni-directional video camera systems are camera systems that photograph a 360° omni-directional view from a single viewpoint. Omni-directional video camera systems include a camera to which a special mirror, such as a hyperboloid mirror, or a special lens, such as a fish-eye lens, is installed or a plurality of cameras to photograph an omni-directional view. Studies on omni-directional video encoding for adapting video information generated by such an omni-directional video camera system to be broadcast are in progress.

An example of using omni-directional video encoding is 3D realistic broadcasting. For example, all image information regarding scenes viewed from diverse viewpoints including a viewpoint of a pitcher, a viewpoint of a catcher, a viewpoint of a hitter, and a viewpoint of an audience on the first base side in a baseball game is provided to a viewer's terminal. The viewer can select a desired viewpoint and view a scene from the desired viewpoint.

Quick Time VR® is an example of 3D realistic broadcasting. According to the Quick Time VR®, photos with a 360° cylindrical or cubical panoramic view can be produced and rotated 360° or zoomed in. However, users must download information regarding all panoramic images in advance of viewing the images, and the quality of these images is very low.

Studies on a technique of applying conventional two-dimensional (2D) image encoding methods, such as Motion Picture Experts Group (MPEG)-4 and H.264, to omni-directional 3D images are in progress. FIG. 1 is a conceptual diagram of a conventional omni-directional video encoding/decoding system. Referring to FIG. 1, an omni-directional image is acquired using an omni-directional photographing unit 110. An image converter 120 converts the omni-directional image into a predetermined format that can be processed by an existing MPEG-4 encoder 130.

An image photographed using an omni-directional camera system using a special lens or mirror or a plurality of cameras has characteristics corresponding to a 3D spherical environment. Since a conventional video codec receives, compresses, and transmits a 2D image, a 3D image photographed using an omni-directional camera system needs to be converted into a 2D image. Cartographical projection and polygonal projection have been presented to convert a 3D image into a 2D image.

Cartographical projection is a process of projecting a spherical shape onto a complete rectangular plane like producing a typical world map. Polygonal projection is a process of projecting a spherical shape into a development figure of a polyhedron.

The MPEG-4 encoder 130 encodes the converted image to generate a bitstream and transmits the bitstream to a decoding unit of a user. An MPEG-4 decoder 140 decodes the bitstream. An image converter 150 converts the decoded bitstream into an omni-directional image. A display unit 160 displays the omni-directional image.

Since the amount of omni-directional image data to be transmitted to a user is large, a very broad bandwidth is needed to transmit the omni-directional image data to the user in real time. Moreover, problems like transmission delay and limits in performance of a user's decoding unit may occur. Furthermore, when conventional 2D image encoding is applied to an omni-directional image as it is, regardless of characteristic differences between an omni-directional image and a 2D image, encoding efficiency decreases.

SUMMARY OF THE INVENTION

The present general inventive concept provides an image encoding method and apparatus by which an omni-directional image is efficiently transmitted and a user's region-of-interest in the omni-directional image is provided to the user with improved picture quality.

The present general inventive concept also provides an image decoding method and apparatus by which a user's region-of-interest with improved picture quality in the omni-directional image is received and displayed.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of encoding an image, the method including generating a first bitstream by encoding an omni-directional image and transmitting the first bitstream to a decoding apparatus, receiving position information of a region-of-interest selected from an image reconstructed based on the first bitstream from the decoding apparatus, and generating a second bitstream by encoding an image of the region-of-interest based on the position information.

The foregoing and/or other aspects of the present general inventive concept are also achieved by providing an apparatus to encode an image, including a first encoder to encode an omni-directional image to generate a first bitstream, a data communicator to transmit the first bitstream to decoding apparatus and to receive position information of a region-of-interest selected from an image reconstructed based on the first bitstream from the decoding apparatus, and a second encoder to encode an image of the region-of-interest based on the position information to generate a second bitstream.

The foregoing and/or other aspects of the present general inventive concept are also achieved by providing a method of decoding an image, the method including receiving a first bitstream generated by encoding an omni-directional image from an encoding apparatus, decoding the first bitstream and displaying a reconstructed image, transmitting position information of a region-of-interest selected from the reconstructed image to the encoding apparatus, receiving a second bitstream generated by encoding an image of the region-of-interest from the encoding apparatus, and decoding the second bitstream.

The foregoing and/or other aspects of the present general inventive concept are also achieved by providing an apparatus to decode an image, including a first decoder to receive a first bitstream generated by encoding an omni-directional image from an encoding apparatus and to decode the first bitstream to generate a reconstructed omni-directional image, a first display unit to display the reconstructed omni-directional image output from the first decoder, a data communicator to transmit position information of a region-of-interest selected from the reconstructed omni-directional image displayed through the first display unit to the encoding apparatus, and a second decoder to receive a second bitstream generated by encoding an image of the region-of-interest from the encoding apparatus and to decode the second bitstream.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
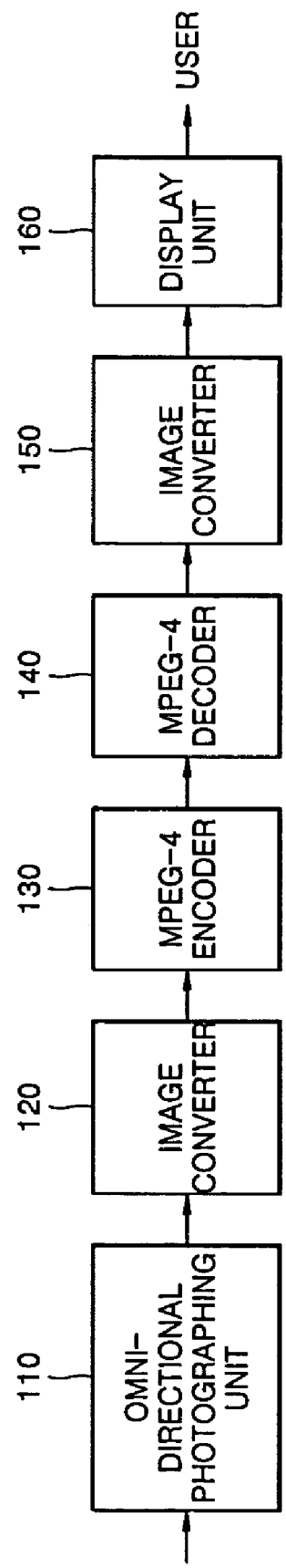
FIG. 1 is a conceptual diagram of a conventional omni-directional video encoding/decoding system.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Instead of viewing a full omni-directional image acquired by an omni-directional camera system at one time, a user may want to make a viewpoint transition based on information regarding the full omni-directional image and closely and partially observe a region-of-interest in the full omni-directional image. To meet the user's demands, embodiments of the present general inventive concept provide a method and apparatus to transmit a portion of the omni-directional image other than the user's region-of-interest to the user's terminal using a minimum bandwidth and transmitting an image of the region-of-interest at a high resolution. In other words, a full panorama image is provided to a decoding apparatus at a low definition to provide the user a rough view of the panorama image. Thereafter, when the user selects a region-of-interest in the full panorama image and transmits position information of the region-of-interest into an encoding apparatus, a high-resolution image of the region-of-interest is provided to the decoding apparatus.

Figure 2:
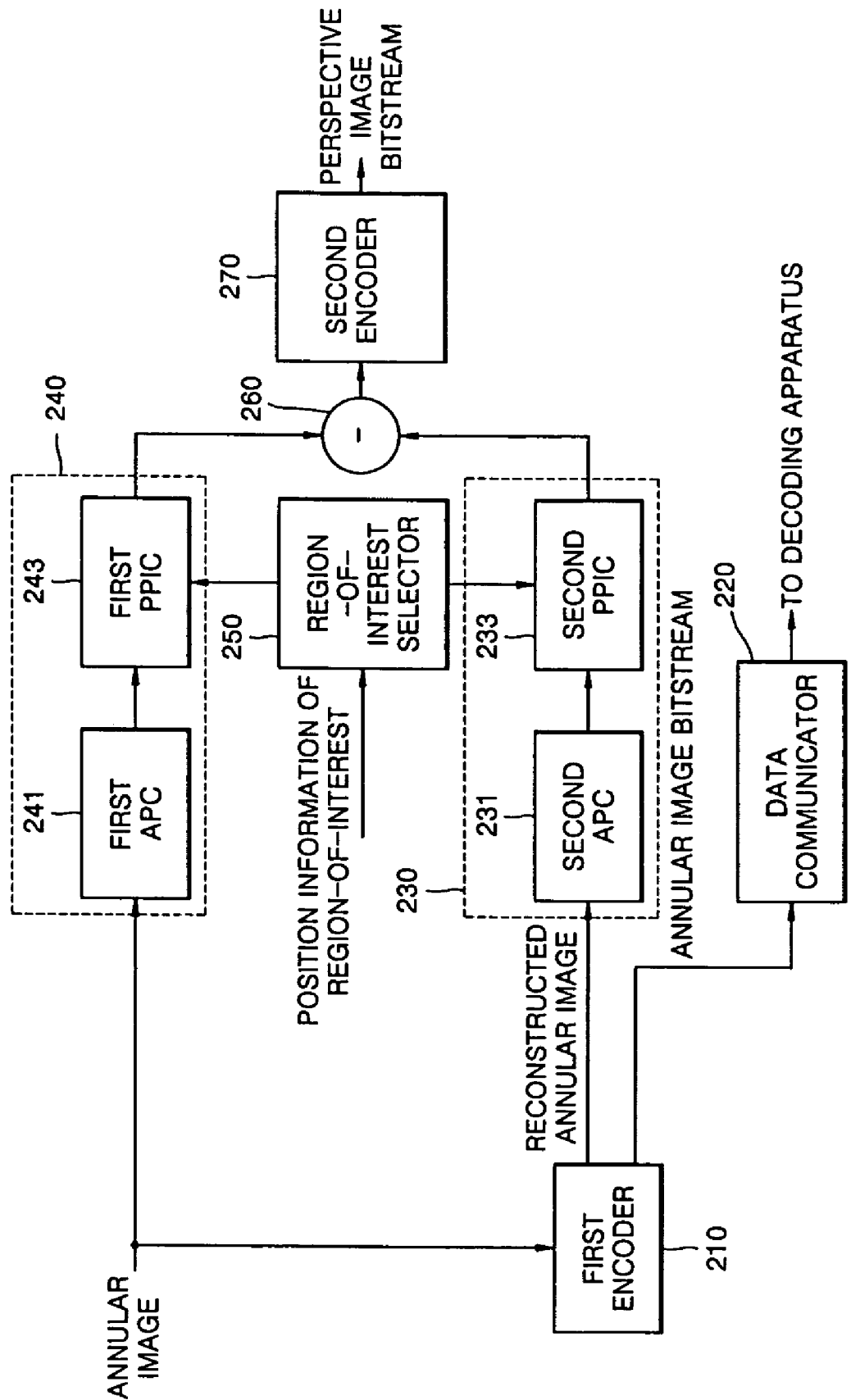
FIG. 2 is a block diagram illustrating an image encoding apparatus according to an embodiment of the present general inventive concept.

FIG. 2 is a block diagram illustrating an image encoding apparatus according to an embodiment of the present general inventive concept. Referring to FIG. 2, the image encoding apparatus includes a first encoder 210, a data communicator 220, a first conversion unit 240, a second conversion unit 230, a region-of-interest selector 250, a subtractor 260, and a second encoder 270.

An omni-directional image photographed by an omni-directional camera system (not shown) is input to the first encoder 210 and the first conversion unit 240. According to the embodiment illustrated in FIG. 2, the omni-directional image may be an annular image, but is not limited thereto.

The omni-directional camera system may be a camera system including a special lens or a combination of a mirror and a lens, and can photograph up to a 360° omni-directional view from a single viewpoint. Sony's TVR-900 and HDW F900 are examples of such an omni-directional camera system. The TVR-900 can photograph a 180° view and the HDW F900 can photograph a 360° view. Alternatively, the omni-directional camera system can obtain an omni-directional image using a plurality of cameras. An annular image is an image that is photographed after being reflected from a mirror in a mirror-based omni-directional camera system and implies a 360° omni-directional image.

The first encoder 210 receives and encodes the annular image using a predetermined method to generate an annular image bitstream. An encoder complying with a Motion Picture Experts Group (MPEG)-4 Part 2 standard or an H.264 (or MPEG-4 Part 10 AVC) standard may be used as the first encoder 210. However, the present general inventive concept is not restricted thereto, and an encoder modified to be suitable to an annular image may alternatively be used as the first encoder 210.

Figure 3:
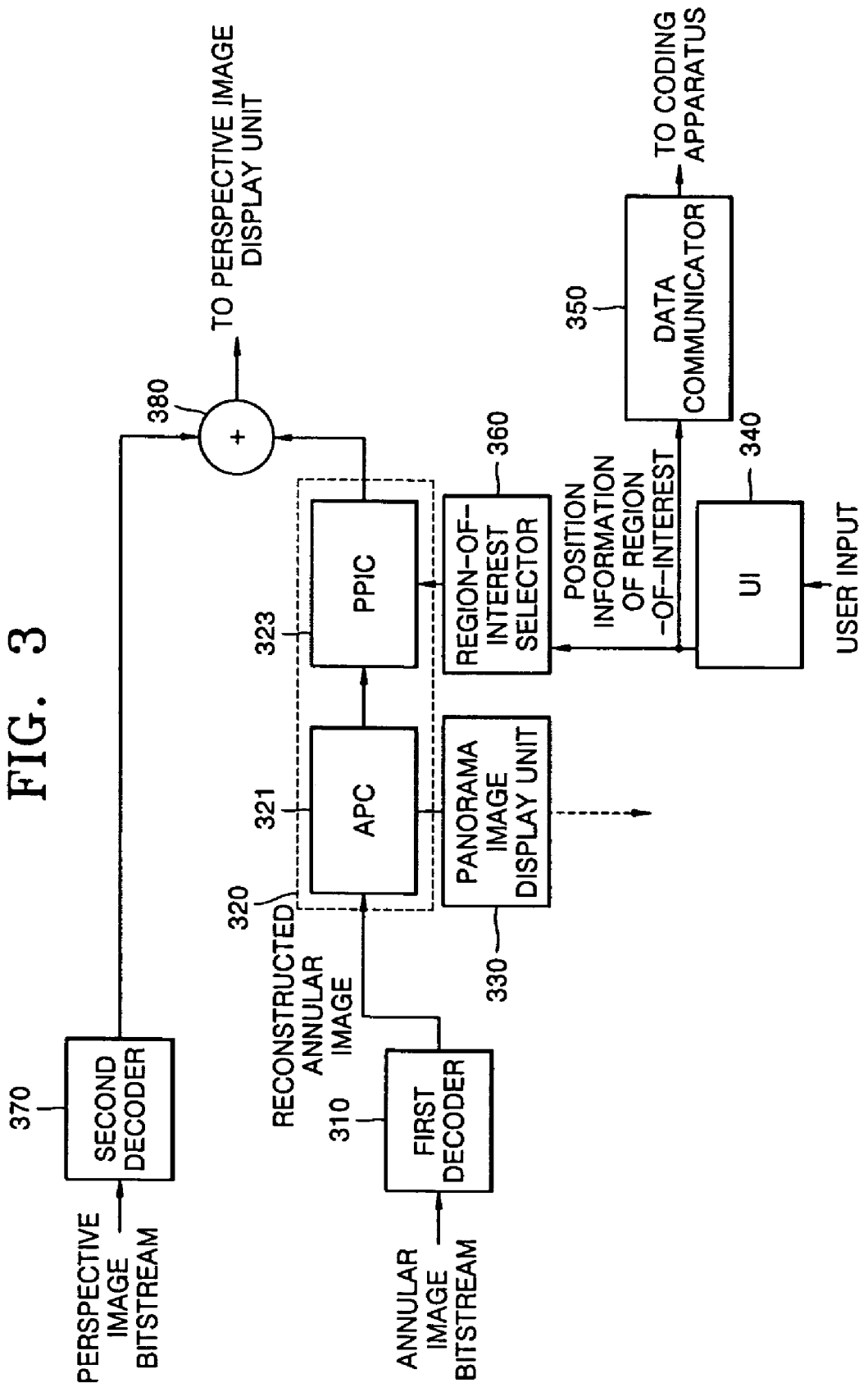
FIG. 3 is a block diagram illustrating an image decoding apparatus according to an embodiment of the present general inventive concept.

An annular image bitstream generated by the first encoder 210 is transmitted via the data communicator 220 to an image decoding apparatus, such as the image decoding apparatus illustrated in FIG. 3. The image decoding apparatus decodes the annular image bitstream to obtain a reconstructed annular image, converts the reconstructed annular image into a panorama image, and displays the panorama image through a panorama image display unit 330 (see FIG. 3). The first encoder 210 also generates a reconstructed annular image suitable to a particular bandwidth based on the annular image bitstream and stores it in a reconstructed annular image buffer (not shown). The first encoder 210 generates the reconstructed annular image by decoding the annular image bitstream generated therein, and therefore the first encoder 210 has a decoding capability as well as an encoding capability. The reconstructed annular image generated by the first encoder 210 is input to the second conversion unit 230.

The first conversion unit 240 includes a first annular-to-panorama converter (APC) 241 and a first panorama-to-perspective image converter (PPIC) 243. The second conversion unit 230 includes a second APC 231 and a second PPIC 233.

The first conversion unit 240 and the second conversion unit 230 respectively convert the original annular image and the reconstructed annular image into a predetermined image format. The first APC 241 and the second APC 231 convert the original annular image and the reconstructed annular image into first and second panorama images, respectively. Cartographical projection and polygonal projection are methods that can be used by the first APC 241 and the second APC 231 to covert the original annular image and the reconstructed annular image into two-dimensional (2D) images (i.e. the first and second panorama images). The first PPIC 243 and the second PPIC 233 convert the first and second panorama images into first and second perspective images, respectively. Parallel projection and perspective projection are methods that can be used by the first PPIC 243 and the second PPIC 237 to convert the first and second panorama images into the first and second perspective images.

The region-of-interest selector 250 receives position information of a region-of-interest selected by a user from an image decoding apparatus, such as the image decoding apparatus illustrated in FIG. 3, and controls the first PPIC 243 and the second PPIC 233 to output the first and second perspective images corresponding to the region-of-interest.

The subtractor 260 outputs an error image between the first perspective image output from the first PPIC 243 and the second perspective image output from the second PPIC 233 to the second encoder 270. The second encoder 270 encodes the error image using a predetermined method to generate a perspective image bitstream to be transmitted to the image decoding apparatus. An encoder complying with the MPEG-4 Part 2 standard or the H.264 (or MPEG-4 Part 10 AVC) standard may be used as the second encoder 270, but the present general inventive concept is not restricted thereto.

Figure 4:
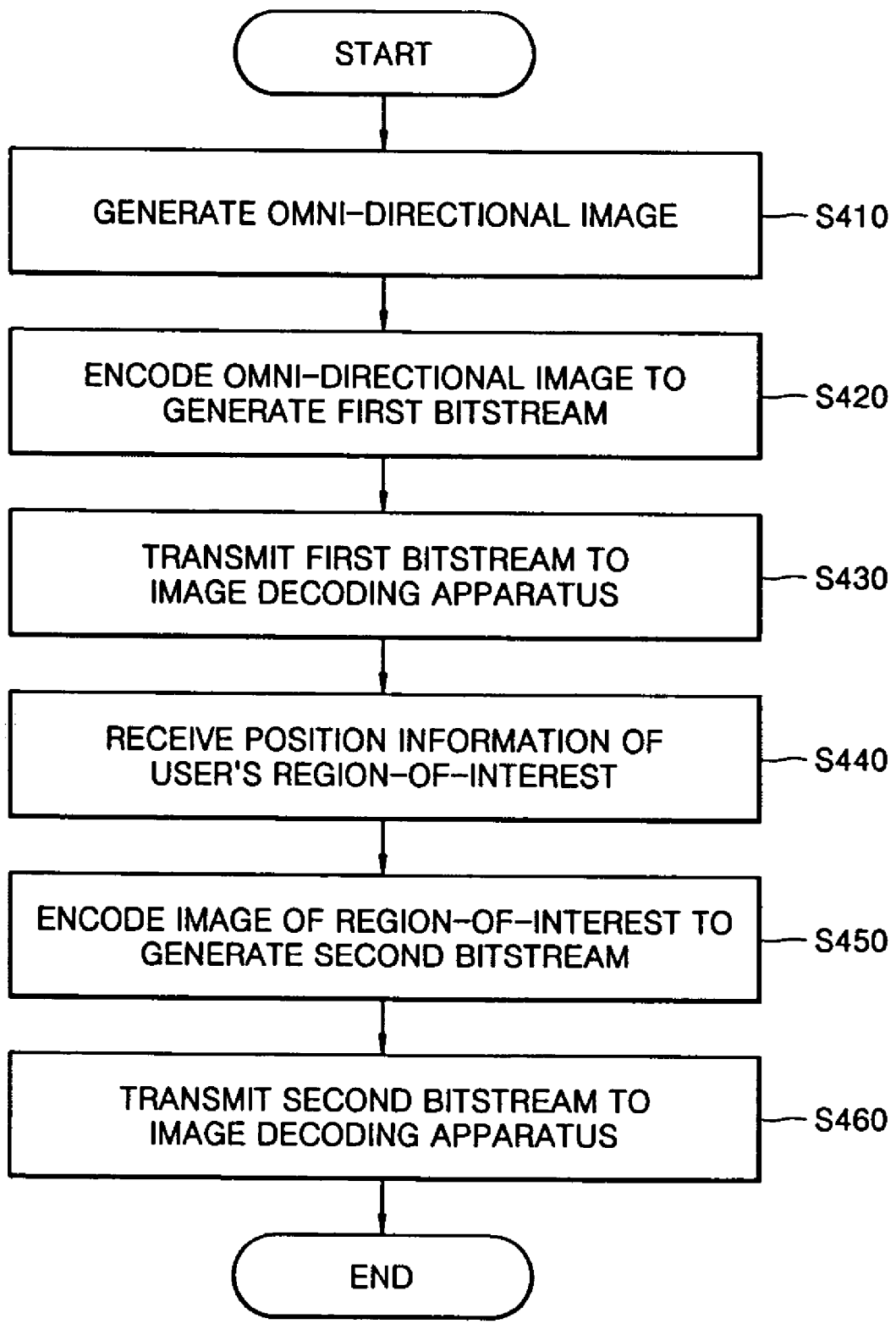
FIG. 4 is a flowchart illustrating a method of encoding an image according to an embodiment of the present general inventive concept.

FIG. 4 is a flowchart illustrating a method of encoding an image according to an embodiment of the present general inventive concept. Referring to FIGS. 2 through 4, at operation S410, an omni-directional annular image is generated by an omni-directional camera system (not shown). The omni-directional annular image is input to the first encoder 210. At operation S420, the omni-directional annular image is encoded by the first encoder 210 using a predetermined encoding method, such as the MPEG-4 Part 2 or the H.264, and thus an annular image bitstream, i.e., a first bitstream, is generated. At operation S430, the annular image bitstream (first bitstream) is transmitted via the data communicator 220 to the image decoding apparatus, as illustrated in FIG. 3, over a predetermined channel.

The image decoding apparatus decodes the received annular image bitstream (first bitstream) to obtain a reconstructed annular image, converts the reconstructed annular image into a panorama image, and displays the panorama image through a panorama image display unit, such as the panorama image display unit 330 of FIG. 3 to be described in more detail infra. The picture quality of the panorama image displayed through the panorama image display unit 330 cannot be guaranteed, but a user can view a full image through the panorama image display unit 330. The user may input a command to select a region-of-interest, which the user wants to view more closely, in the full image displayed by the panorama image display unit 330, using a user interface (UI) 340 (see FIG. 3).

Position information of the region-of-interest is output from the UI 340 and transmitted through a data communicator 350 (see FIG. 3) to the image encoding apparatus of FIG. 2. Then, at operation S440, the position information of the region-of-interest is received by the region-of-interest selector 250 of the image encoding apparatus. The region-of-interest selector 250 controls the first PPIC 243 and the second PPIC 233 to output images corresponding to the region-of-interest according to the position information of the region-of-interest. The first PPIC 243 extracts an image corresponding to the region-of-interest from a first panorama image output from the first APC 241 and converts the extracted image into a first perspective image. Similarly, the second PPIC 233 extracts an image corresponding to the region-of-interest from a second panorama image output from the second APC 231 and converts the extracted image into a second perspective image.

The first perspective image output from the first PPIC 243 is a result of converting an original annular image into the first panorama image and then converting the first panorama image into the first perspective image. The second perspective image output from the second PPIC 233 is a result of converting a reconstructed annular image output from the first encoder 210 into the second panorama image and then converting the second panorama image into the second perspective image. In other words, the first perspective image output from the first PPIC 243 may be referred to as an original region-of-interest image and the output image from the second PPIC 233 may be referred to as a reconstructed region-of-interest image.

The subtractor 260 outputs an error image between the original region-of-interest image and the reconstructed region-of-interest image to the second encoder 270. When encoding the error image between the original region-of-interest image and the reconstructed region-of-interest image, an amount of transmission data can be reduced as compared to encoding all of the original region-of-interest image. At operation S450, the second encoder 270 encodes the error image using a predetermined encoding method, such as the MPEG-4 Part 2 or the H.264, to generate a perspective image bitstream, i.e. a second bitstream, to be transmitted to the image decoding apparatus. At operation S460, the perspective image bitstream (second bitstream) is transmitted to the image decoding apparatus. As a result, the user can view a high-resolution image of the region-of-interest.

As briefly described above, FIG. 3 illustrates an image decoding apparatus according to an embodiment of the present general inventive concept. The embodiment of FIG. 3 will be described in more detail below. Referring to FIG. 3, the image decoding apparatus according to the present embodiment includes a first decoder 310, a conversion unit 320, the UI 340, the data communicator 350, a region-of-interest selector 360, a second decoder 370, and a mixer 380.

The image decoding apparatus of FIG. 3 receives an annular image bitstream and a perspective image bitstream from an image encoding apparatus, such as the image encoding apparatus of FIG. 2, and displays a full panorama image through the panorama image display unit 330 and a perspective image of a region-of-interest through a perspective image display unit (not shown).

The first decoder 310 receives and decodes the annular image bitstream generated by encoding an annular image. The conversion unit 320 includes an APC 321 and a PPIC 323. The conversion unit 320 receives a reconstructed annular image output from the first decoder 310 and converts the reconstructed annular image into a predetermined image format. The APC 321 converts the reconstructed annular image into a panorama image. The PPIC 323 converts the panorama image into a perspective image.

The UI 340 receives a command input by a user. The data communicator 350 performs data communication with an image encoding apparatus, such as the image encoding apparatus of FIG. 2. The region-of-interest selector 360 receives position information of a region-of-interest selected by the user from the UI 340 and controls the PPIC 323 to output an image of the region-of-interest.

The mixer 380 mixes an output image from the second decoder 370 and the image output from the PPIC 323 to generate a perspective image to be displayed by the perspective image display unit. As described above, since the perspective image bitstream is not the result of encoding an original region-of-interest image but the result of encoding an error image between the original region-of-interest image and a reconstructed region-of-interest image, the output image from the second decoder 370 is the error image between the original region-of-interest image and the reconstructed region-of-interest image. Accordingly, a complete perspective image can be obtained by mixing the error image, i.e., the output image from the second decoder 370 and the reconstructed region-of-interest image, i.e., the output image from the PPIC 323.

Figure 5:
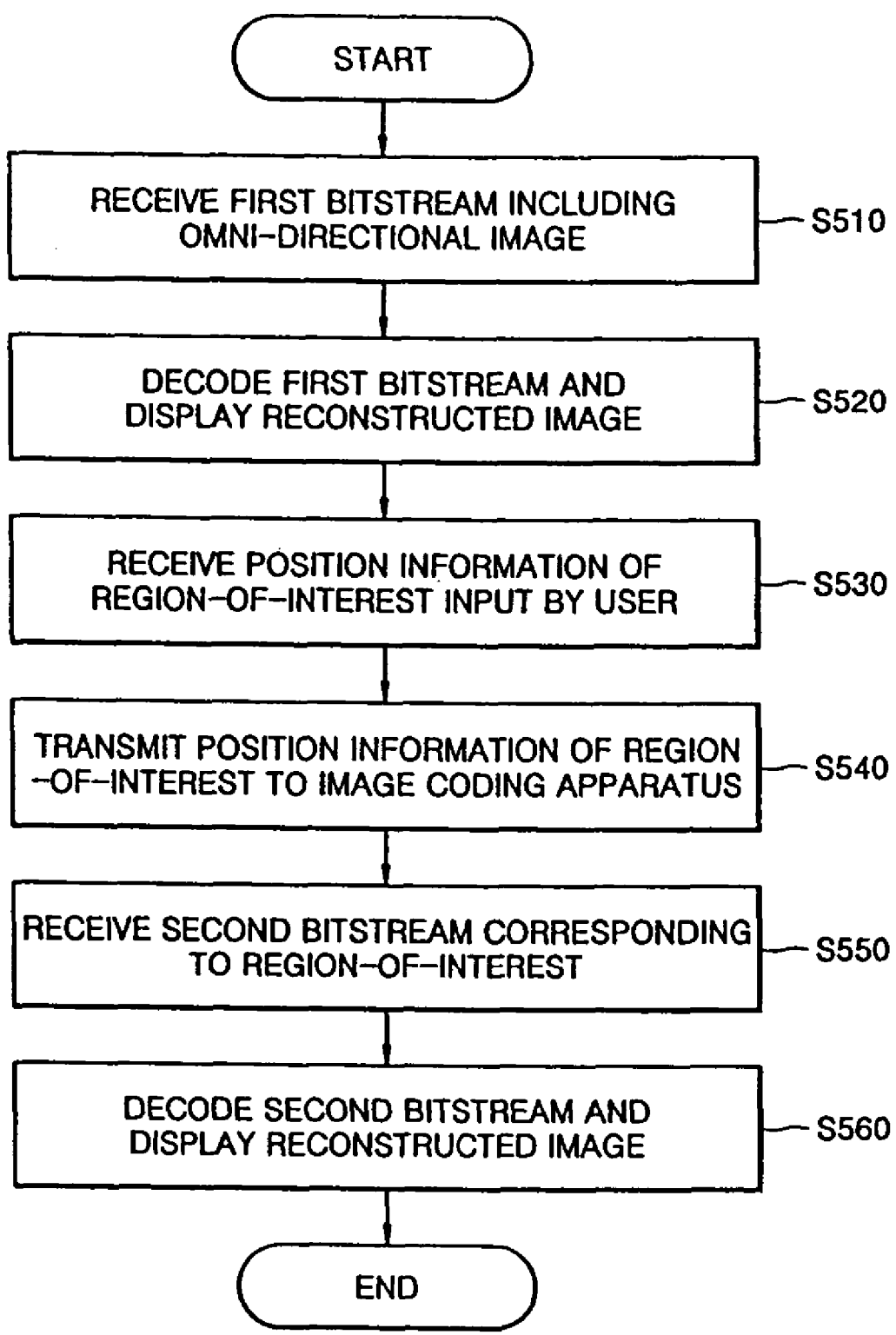
FIG. 5 is a flowchart illustrating a method of decoding an image according to an embodiment of the present general inventive concept.

FIG. 5 is a flowchart illustrating a method of decoding an image according to an embodiment of the present general inventive concept. Referring to FIGS. 3 and 5, at operation S510, an annular image bitstream, i.e., a first bitstream generated by encoding an omni-directional annular image, is received through the data communicator 350. At operation S520, the annular image bitstream (first bitstream) is decoded by the first decoder 310 and then converted into a panorama image by the APC 321, and the panorama image is displayed by the panorama image display unit 330.

Then, a user can view the panorama image that is not a high-resolution image but provides an omni-directional image through the panorama image display unit 330. The user may input a command to select a region-of-interest, which the user wants to view more closely in the omni-directional image displayed by the panorama image display unit 330, using the UI 340. At operation S530, position information of the region-of-interest is output from the UI 340 and received by the region-of-interest selector 360. At operation S540, the position information of the region-of-interest output from the UI 340 is transmitted through the data communicator 350 to an image encoding apparatus, such as the image encoding apparatus illustrated in FIG. 2. The image encoding apparatus generates a perspective image bitstream including high-resolution perspective image data corresponding to the region-of-interest based on the position information of the region-of-interest and transmits the perspective image bitstream to the image decoding apparatus of FIG. 3.

At operation 550, the perspective image bitstream, i.e., a second bitstream, is received through the data communicator 350 and input to the second decoder 370. At operation S560, the perspective image bitstream (second bitstream) is decoded by the second decoder 370 and then output to the mixer 380. The mixer 380 mixes an output image from the second decoder 370 and an output image from the PPIC 323, thereby generating a perspective image of the region-of-interest. The perspective image of the region-of-interest is displayed by the perspective image display unit (not shown).

Figure 6:
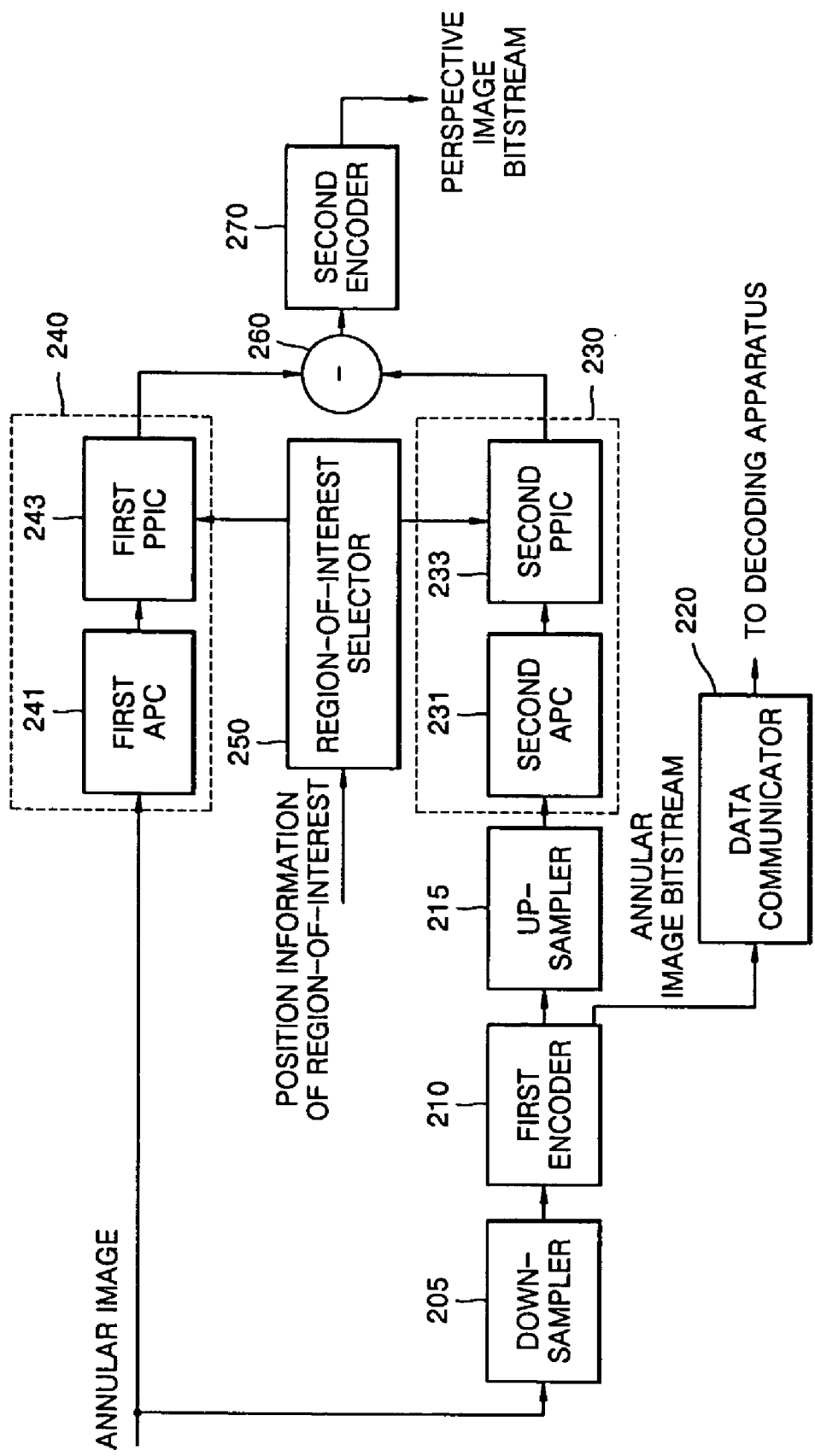
FIG. 6 is a block diagram illustrating an image encoding apparatus according to another embodiment of the present general inventive concept.

FIG. 6 is a block diagram illustrating an image encoding apparatus according to another embodiment of the present general inventive concept. The image encoding apparatus of FIG. 6 has a similar structure to the image encoding apparatus of FIG. 2, with the exception that the image encoding apparatus of FIG. 6 further includes a down-sampler 205 and an up-sampler 215 to provide spatial scalability.

Figure 7:
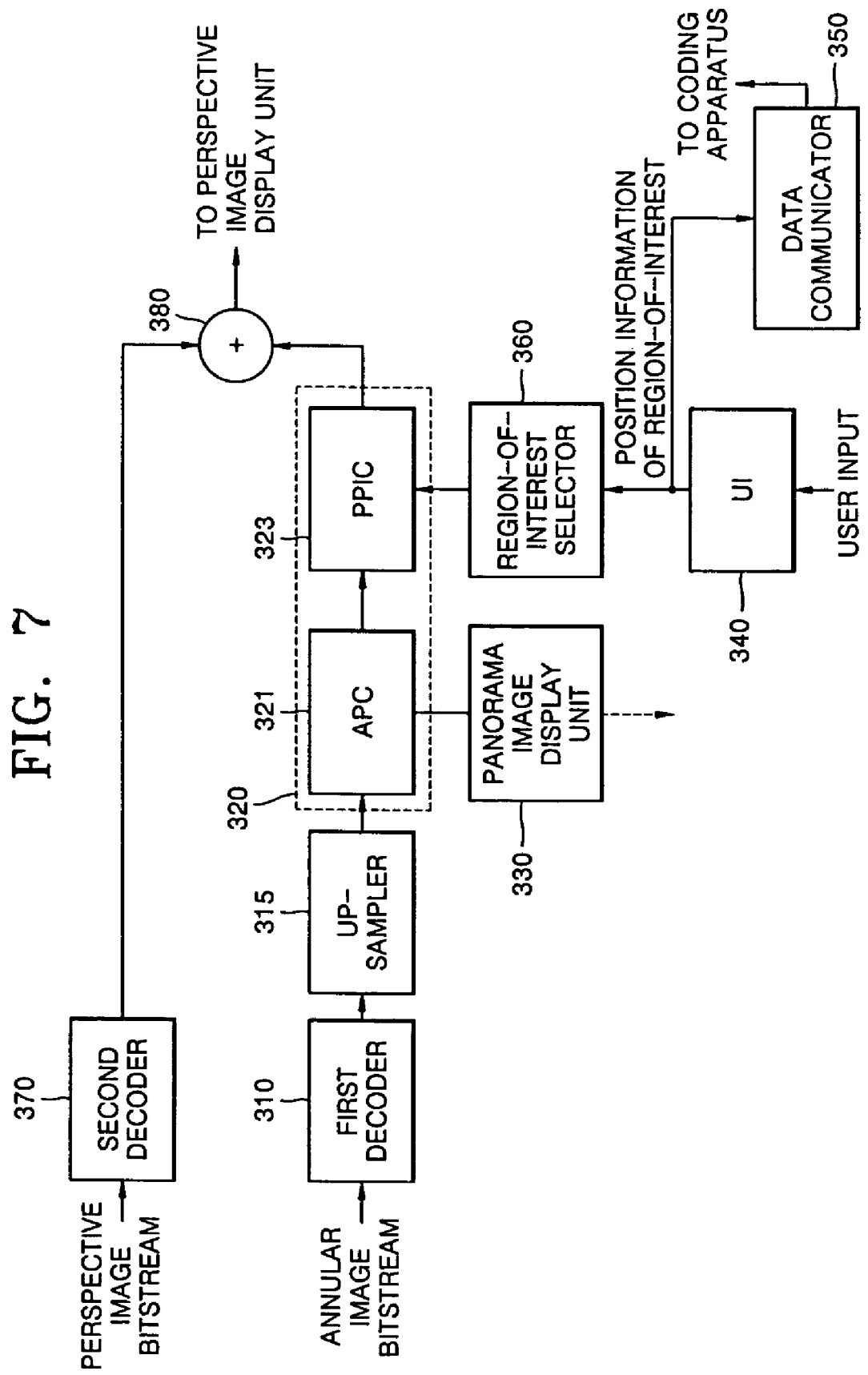
FIG. 7 is a block diagram illustrating an image decoding apparatus according to another embodiment of the present general inventive concept.

FIG. 7 is a block diagram illustrating an image decoding apparatus according to another embodiment of the present general inventive concept. The image decoding apparatus of FIG. 7 is provided to correspond to the image encoding apparatus of FIG. 6 and has a similar structure to the image decoding apparatus of FIG. 3, with the exception that the image decoding apparatus of FIG. 7 further includes an up-sampler 315 to up-sample an output image from the first decoder 310 in order to correspond to the image encoding apparatus of FIG. 6, which provides spatial scalability.

The present general inventive concept can also be embodied as computer readable codes on a computer readable recording medium. The computer readable recording medium can be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems such that the computer readable code is stored and executed in a distributed fashion.

As described above, according to the embodiments of the present general inventive concept, a rough omni-directional image is transmitted first to a decoding apparatus through a channel having a restricted bandwidth and then a high-resolution image of a region-of-interest selected by a user from the omni-directional image is provided to the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of encoding an image, comprising:
generating a first bitstream by encoding an omni-directional image and transmitting the first bitstream to a decoding apparatus;
receiving from the decoding apparatus position information of a region-of-interest selected from an image reconstructed based on the first bitstream; and
generating a second bitstream by encoding an image of the region-of-interest based on the position information,
wherein the generating of the second bitstream comprises:
obtaining a first image corresponding to the region-of-interest from the omni-directional image;
obtaining a reconstructed omni-directional image by decoding the first bitstream;
obtaining a second image corresponding to the region-of-interest from the reconstructed omni-directional image; and
obtaining an error image corresponding to a difference between the first image and the second image and encoding the error image to generate the second bitstream.

2. The method of claim 1, wherein
the obtaining of the first image comprises:
converting the omni-directional image into a first panorama image, and
obtaining the first image from the first panorama image, and
the obtaining of the second image comprises:
converting the reconstructed omni-directional image into a second panorama image, and
obtaining the second image from the second panorama image.

3. The method of claim 2, wherein
the obtaining of the first image from the first panorama image comprises:
selecting the region-of-interest from the first panorama image, and
converting the region-of-interest selected from the first panorama image into perspective image to obtain the first image, and
the obtaining of the second image from the second panorama image comprises:
selecting the region-of-interest from the second panorama image, and converting the region-of-interest selected from the second panorama image into a perspective image to obtain the second image.

4. The method of claim 1, further comprising:
down-sampling the omni-directional image before generating the first bitstream, wherein the obtaining of the reconstructed omni-directional image comprises performing up-sampling corresponding to the down-sampling.

5. A method of encoding an image, comprising:
encoding an input omni-directional image and outputting the encoded omni-directional image at a first resolution;
encoding an image corresponding to a region of the input omni-directional image determined according to input position information and outputting the encoded image corresponding to the region of the input omni-directional image at a second resolution,
wherein the encoding of the image corresponding to the region of the input omni-directional image comprises:
decoding the encoded omni-directional image output at the first resolution;
generating a first perspective image of a region of the decoded omni-directional image according to the input position information;
generating a second perspective image of the region of the input omni-directional image according to the input position information;
calculating an error image corresponding to a difference between the second perspective image and the first perspective image; and
encoding the calculated error image.

6. The method of claim 5, wherein the second resolution is higher than the first resolution.

7. An apparatus to encode an image, comprising:
a first encoder to encode an omni-directional image to generate a first bitstream;
a data communicator to transmit the first bitstream to a decoding apparatus and to receive from the decoding apparatus position information of a region-of-interest selected from an image reconstructed based on the first bitstream;
a region-of-interest selector to receive the position information of the region-of-interest and to output a region selection control signal;
a first conversion unit to output a first image corresponding to the region-of-interest in the omni-directional image in response to the region selection control signal;
a second conversion unit to output a second image corresponding to the region-of-interest in a reconstructed omni-directional image, which is generated by the first encoder by decoding the first bitstream, in response to the region selection control signal; and
a subtractor to output an error image between the first image and the second image to the second encoder as the image of the region-of-interest to be encoded by the second encoder; and
a second encoder to encode an image of the region-of-interest based on the position information to generate a second bitstream.

8. The apparatus of claim 7, wherein
the first conversion unit comprises:
a first panorama image generator to convert the omni-directional image into a first panorama image and to output the first panorama Image, and
a first perspective image generator to convert a portion corresponding to the region-of-interest in the first panorama image into a first perspective image and to output the first perspective image, and
the second conversion unit comprises:
a second panorama image generator to convert the reconstructed omni-directional image into a second panorama image and to output the second panorama image, and
a second perspective image generator to convert a portion corresponding to the region-of-interest in the second panorama image into a second perspective image and to output the second perspective image.

9. The apparatus of claim 7, further comprising:
a down-sampler to down-sample the omni-directional image and to output the result of the down-sampling to the first encoder; and
an up-sampler to perform up-sampling corresponding to the down-sampling with respect to the reconstructed omni-directional image generated by the first encoder and to output the result of the up-sampling.

10. An image encoding apparatus, comprising:
a first encoding unit to encode an input omni-directional image and to decode the encoded input omni-directional image;
a region-of-interest unit to receive input position information of a selected region of interest of the input omni-directional image and to generate first and second perspective images of the selected region of interest in the input omni-directional image and the decoded omni-directional image, respectively, according to the received position information, the region-of-interest unit including:
a first conversion unit to generate the first perspective image of the selected region in the input omni-directional image;
a second conversion unit to generate the perspective second image of the selected region in the decoded omni-directional image: and
a region-of-interest selector to receive the input position information of the selected region of interest and to control the first and second conversion units according to the received position information; and
a second encoding unit to encode an error image corresponding to a difference between the first and second perspective images of the selected region of interest,
wherein the second encoding unit transmits the encoded error image at a higher resolution than the first encoding unit transmits the encoded omni-directional image.

11. The image encoding apparatus of claim 10, wherein the first conversion unit comprises a first omni-to-panorama converter to convert the input omni-directional image into a first panorama image and a first panorama-to-perspective image converter to convert a portion of the first panorama image into the first perspective image according to the input position information, and the second conversion unit comprises a second omni-to-panorama converter to convert the decoded omni-directional image into a second panorama image and a second panorama-to-perspective image converter to convert a portion of the second panorama image into the second perspective image according to the input position information.

12. The image encoding apparatus of claim 10, further comprising:
a data communicator to transmit the encoded omni-directional image and the encoded error image to an external decoding apparatus and to receive the input position information of the selected region-of-interest from the external decoding apparatus and transmit the received position information to the region-of-interest unit.

13. The image encoding apparatus of claim 10, wherein the region-of-interest is selected from the decoded omni-directional image.

14. A method of decoding an image, comprising:
receiving from an encoding apparatus a first bitstream generated by encoding an omni-directional image;
decoding the first bitstream and displaying a reconstructed image;
transmitting position information of a region-of-interest selected from the displayed reconstructed image to the encoding apparatus;
receiving a second bitstream generated by encoding an image of the region-of-interest from the encoding apparatus; and
decoding the second bitstream,
wherein the decoding of the second bitstream comprises:
obtaining a first image corresponding to the region-of-interest by decoding the second bitstream;
obtaining a second image corresponding to the region-of-interest from the reconstructed image; and
generating a combined perspective image corresponding to the region-of-interest by mixing the first image and the second image.

15. The method of claim 14, wherein the obtaining of the second image comprises:
converting the reconstructed image into a panorama image;
selecting the region-of-interest from the panorama image; and
converting the region-of-interest into a perspective image to obtain the second image.

16. The method of claim 14, further comprising, when down-sampling is performed when the encoding apparatus encodes the omni-directional image, performing up-sampling corresponding to the down-sampling with respect to the reconstructed omni-directional image.

17. An apparatus to decode an image, comprising:
a first decoder to receive from an encoding apparatus a first bitstream generated by encoding an omni-directional image and to decode the first bitstream to generate a reconstructed omni-directional image;
a first display unit to display the reconstructed omni-directional image decoded by the first decoder;
a data communicator to transmit position information of a region-of-interest selected from the reconstructed omni-directional image displayed by the first display unit to the encoding apparatus;
a second decoder to receive a second bitstream generated by encoding an image of the region-of-interest from the encoding apparatus and to decode the second bitstream;
a region-of-interest selector to receive the position information of the selected region-of-interest and to output a region selection control signal;
a conversion unit to output an image corresponding to the region-of-interest in the reconstructed omni-directional image In response to the region selection control signal; and
a mixer to mix an image output from the second decoder and the image output from the conversion unit.

18. The apparatus of claim 17, wherein the conversion unit comprises:
a panorama image generator to convert the reconstructed omni-directional image decoded by the first decoder into a panorama image; and
a perspective image generator to convert a portion corresponding to the region-of-interest in the panorama image into a perspective image in response to the region selection control signal and to output the perspective image to the mixer.

19. The apparatus of claim 17, further comprising:
an up-sampler to perform up-sampling corresponding to down-sampling performed when the encoding apparatus encodes the omni-directional image with respect to the reconstructed omni-directional image.

20. An image decoding apparatus, comprising:
a first decoding unit to decode an input encoded omni-directional image;
a region-of-interest unit to select a region-of-interest in the decoded omni-directional image, to output position information of the selected region of interest, and to generate a perspective image of the selected region-of-interest in the decoded omni-directional image;
a second decoding unit to decode an input error image; and
a calculating unit to combine the perspective image of the selected region-of-interest in the decoded omni-directional image and the decoded error image to form a combined region-of-interest image,
wherein the region-of-interest unit comprises:
a display to display the decoded omni-directional image;
a user interface to allow a user to select the region-of-interest according to the displayed omni-directional image; and
a conversion unit to generate the perspective image of the selected region-of-interest in the decoded omni-directional image.

21. The image decoding apparatus of claim 20, wherein the conversion unit comprises:
an omni-to-panorama converter to convert the decoded omni-directional image into a panorama image and output the panorama image to the display to be displayed thereon; and
a panorama-to-perspective image converter to convert a portion of the panorama image corresponding to the selected region-of-interest to the perspective image of the selected region-of-interest.

22. The image decoding apparatus of claim 20, further comprising:
one or more displays to display the decoded omni-directional image and the combined region-of-interest image.

23. A non-transitory computer readable recording medium to record a program to implement a method of decoding an image, the method comprising:
receiving from an encoding apparatus a first bitstream generated by encoding an omni-directional image;
decoding the first bitstream and displaying a reconstructed image;
transmitting position information of a region-of-interest selected from the reconstructed image to the encoding apparatus;
receiving from the encoding apparatus a second bitstream generated by encoding an image of the region-of-interest; and
decoding the second bitstream,
wherein the decoding of the second bitstream comprises:
obtaining a first image corresponding to the region-of-interest by decoding the second bitstream;
obtaining a second image corresponding to the region-of-interest from the reconstructed image; and
generating a combined perspective image corresponding to the region-of-interest by mixing the first image and the second image.

24. A non-transitory computer readable recording medium to record a program to implement a method of encoding an image, the method comprising:

encoding an input omni-directional image and outputting the encoded omni-directional image at a first resolution; and encoding an image corresponding to a region of the input omni-directional image determined according to input position information and outputting the encoded image corresponding to the region of the input omni-directional image at a second resolution, wherein the encoding of the image corresponding to the region of the input omni-directional image comprises:

decoding the encoded omni-directional image output at the first resolution;

generating a first perspective image of a region of the decoded omni-directional image according to the input position information;

generating a second perspective image of the region of the input omni-directional image according to the input position information;

calculating an error image corresponding to a difference between the second perspective image and the first perspective image; and encoding the calculated error image.

* * * * *